Figure 1:
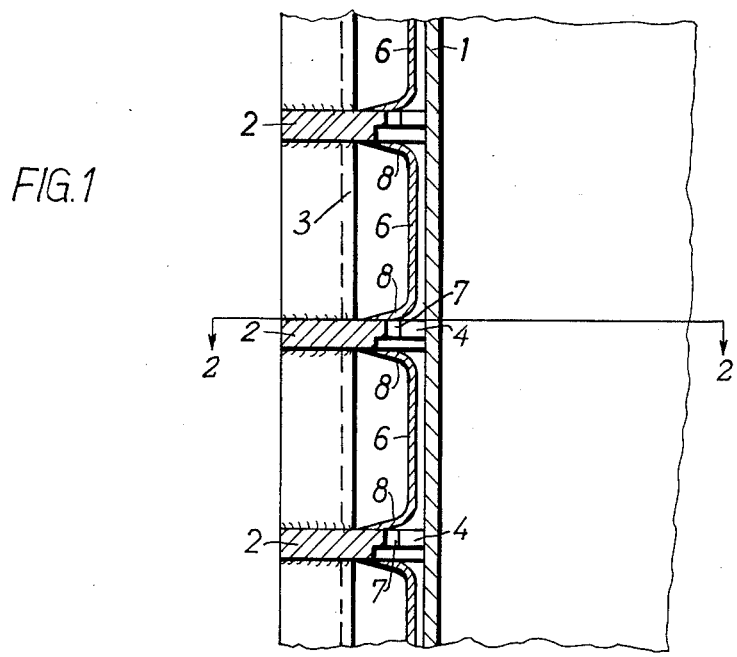

INVENTOR.
RUDOLF SÖHNGEN

United States Patent Office 3,045,858
Patented July 24, 1962

3,045,858
WELDED CONSTRUCTIONS FOR ROTATIONALLY SYMMETRICAL CONTAINERS
Rudolf Söhngen, Leverkusen, Germany, assignor to Farbenfabriken Bayer Aktiengesellschaft, Leverkusen, Germany, a corporation of Germany
Filed June 24, 1959, Ser. No. 822,551
Claims priority, application Germany July 3, 1958
3 Claims. (Cl. 220—10)

The present invention relates to welded constructions for rotationally symmetrical containers.

Cylindrical or other rotationally symmetrical pressure or vacuum vessels, sometimes fitted with externally heating or cooling systems, are frequently constructed for chemical apparatus. Such apparatus require an extremely small tolerance of the circular dimensions because of the agitator or mixer rotating inside the container, since the arms of an agitator or mixer must move very close to the wall of the container. The following apparatus are mentioned as examples of such constructions:

Reaction vessels for endothermic or exothermic reactions, mixers for substances in the form of powder, paste or liquid, thin-film evaporators and blade-type driers with different wiper and rotor systems and coolers and crystallisers with built-in scrapers.

When such apparatus are made of steel, cast iron or cast steel, all inaccuracies in manufacture can be allowed for by suitable additions of material to initially machined parts, so that internal mechanical machining provides the required tolerance for the reaction vessel.

If it is desired to construct such apparatus as welded constructions, the necessary wall tolerance and high accuracy for the rotor system must be obtained by subsequent mechanical machining. However, this cannot be done economically because of the high losses of material, especially when the apparatus are made of relatively costly materials such as refined steels, stainless steels, non-ferrous metals etc.

According to the present invention it is proposed that, for the welded construction of the rotationally symmetrical housings of apparatus, a supporting frame is welded first of all from for example cast steel section irons and circular rings, to conform to the intended constructional shapes and this frame is machined mechanically at the places where subsequently the plate forming the container wall are to bear. Advantageously this is at internal surfaces of the rings. In accordance with this working method, the initially curved wall plates of the container are welded flush with the machined inner surfaces of the rings so that the finished container has practically the same degree of roundness as the initially turned supporting rings. At the same time, the construction of the supporting frame can be so formed, with suitable sub-division into smaller areas, that they relieve the relatively thin-walled container or vessel from loads caused by the heavy fittings and from the hydrostatic forces which originate from the contents of the container or from the external heating or cooling system. This leads to economical constructions, especially when the apparatus are made of refined steel.

One additional feature of the invention is that the construction of the supporting frame is so designed that the different heat expansion of the inner vessel relatvie to the supporting rings are compensated for in the operating condition, especially when using materials having different coefficients of heat expansion.

For this purpose, the supporting rings are provided on the side facing the container wall with short cut-outs which are at a certain angle to the actual radius of contact, whereby the annular surface supporting the container wall is split up into separate spring elements.

Figure 2:
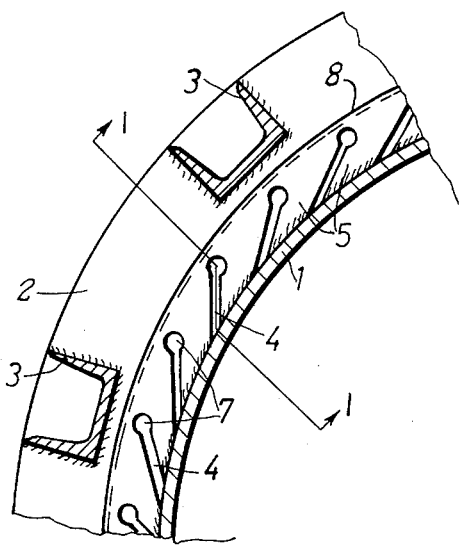

The basic features of the invention are shown diagrammatically by reference to one constructional example in FIGS. 1 and 2 of the accompanying drawing wherein FIG. 1 is a schematic partial view in section of a welded construction in accordance with the invention taken along lines 1—1 of FIG. 2 and FIG. 2 is a schematic partial view in section of the welded construction of FIG. 1 taken along the lines 2—2 of FIG. 1. The wall 1 of the reaction vessel is fitted without play on the inner initially turned supporting rings and is then welded to the latter. The reference 3 represents the vertical stays of the supporting frame made of section irons. These stays have the necessary dimensions to correspond to the loads to be taken up, and to the diameter of the container, and are arranged on the external circumference of the rings 2. By means of the cut-outs 4 on the inside of the circular supporting rings 2, which are at an obtuse angle to the actual radius of contact, the inside of the supporting rings 2 is converted into a plurality of resilient supporting elements 5 for the vessel 1. The reference 6 represents an external casing for guiding the heating or cooling liquid, which is welded between the supporting rings 2. The inclined cut-outs 4 from the inside of the supporting rings 2 serve simultaneously as connecting ducts 7 to the individual external wall zones 6 between the rings 2. The conical or tapered end enlargements 8 of the heating or cooling jacket sections 6 give the heating or cooling system a certain mechanical elasticity.

I claim:

1. A construction for rotationally symmetrical vessels having movable parts moving close to the inside wall surface of the vessel comprising a rigid cylindrical skeleton frame of circular transverse cross section and a vessel wall covering of metal sheet of substantially uniform thickness providing inner and outer wall surfaces, said frame being formed of a multiple number of supporting rings held in spaced apart axial alignment by longitudinal ribs, said rings having inner annular surfaces precisely machined to the correct peripheral dimensions of the vessel outside wall surface, said wall covering being axially disposed within and firmly secured to said rings with said machined inner annular surfaces of the rings in precise continuous abutment with the outside wall surface of said wall covering along their entire common extent whereby the machined inner annular surfaces of said rings control the shape and size of the vessel interior, said rings being provided with openings extending therethrough in the axial direction, said openings being in the form of slots extending from the inner annular surfaces of the rings peripherally outwardly in a direction inclined in the plane of the ring to the direct radial direction.

2. Construction according to claim 1 including a heat exchange jacket extending axially between the supporting rings and radially outwardly of said vessel outer wall surface, said inclined slots defining passages for heat exchange media in said jacket.

3. Construction according to claim 2 in which said jacket is provided with end portions axially adjacent to the corresponding rings, said end portions being formed as frusto-conical radially outward extensions connected to said corresponding rings.

References Cited in the file of this patent

UNITED STATES PATENTS

| | | |
|---|---|---|
| 1,863,958 | Wulff et al. | June 21, 1932 |
| 2,000,780 | Miller | May 7, 1935 |
| 2,395,685 | Schmitz | Feb. 26, 1946 |
| 2,401,606 | Brown | June 4, 1946 |
| 2,767,962 | Blackburn | Oct. 23, 1956 |
| 2,797,078 | Staul | June 25, 1957 |

FOREIGN PATENTS

| | | |
|---|---|---|
| 500,608 | Great Britain | Feb. 13, 1959 |
| 419,728 | Italy | Apr. 2, 1947 |